(No Model.)
H. W. LIBBEY.
ANTI FRICTION BEARING.
No. 411,818. Patented Oct. 1, 1889.
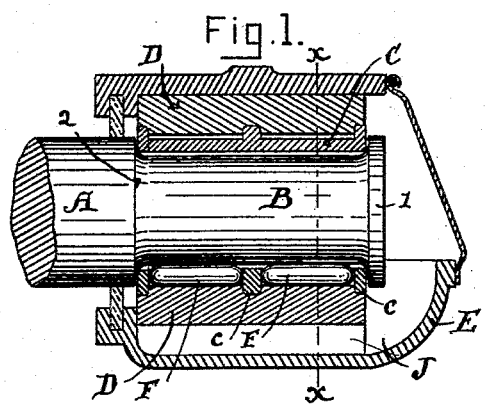
Fig. 1.
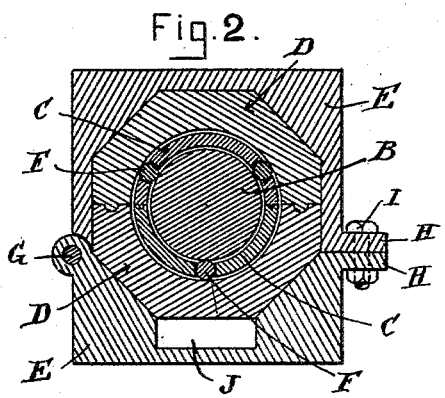
Fig. 2.
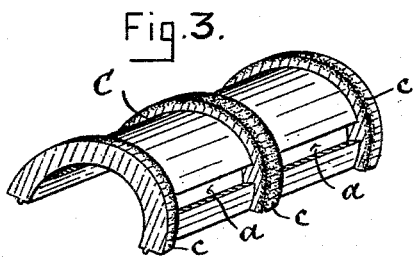
Fig. 3.
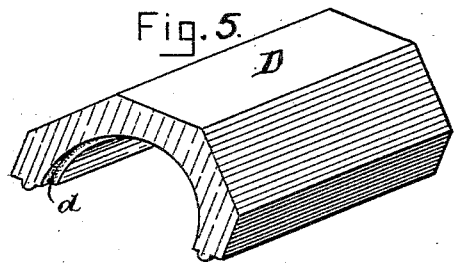
Fig. 5.
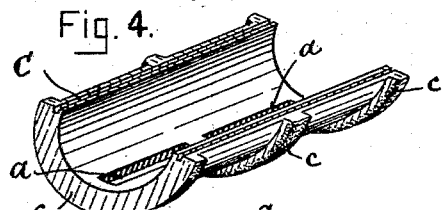
Fig. 4.
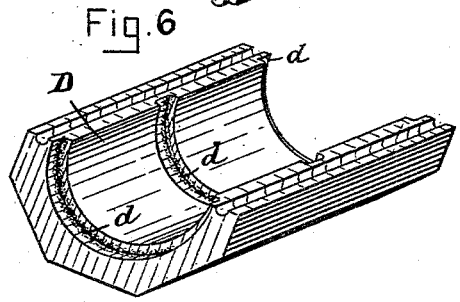
Fig. 6.
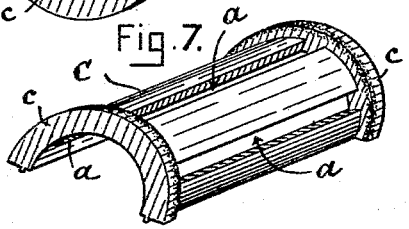
Fig. 7.
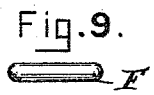
Fig. 9.
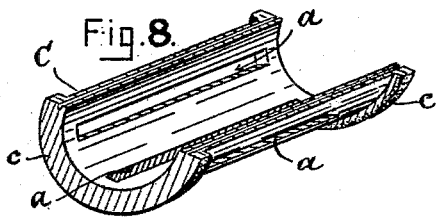
Fig. 8.
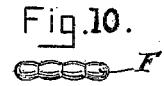
Fig. 10.
Fig. 11.
Witnesses.
George D. Reid
Timothy O'Connell
Inventor
Hosea W. Libbey
by Edwin Plante
Attorney.

UNITED STATES PATENT OFFICE.

HOSEA W. LIBBEY, OF BOSTON, MASSACHUSETTS.

ANTI-FRICTION BEARING.

SPECIFICATION forming part of Letters Patent No. 411,818, dated October 1, 1889.

Application filed December 17, 1888. Serial No. 293,789. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Anti-Friction Journal-Bearings, of which the following, taken in connection with the accompanying drawings, is a specification.

My invention has for its object the diminution of friction in journal-bearings, and particularly in the bearings of railroad-car axles; and its consists in certain details of construction, hereinafter fully described, and pointed out in the claims.

Referring to the accompanying drawings, Figure 1 represents a longitudinal vertical section through a car-axle bearing and box embodying my invention. Fig. 2 is a transverse section taken on line $xx$ of Fig. 1. Fig. 3 is a perspective view of the upper portion of the sleeve that embraces the axle-journal. Fig. 4 is a similar view of the lower portion of the same. Fig. 5 is a perspective view of the upper portion of the bearing in which the sleeve revolves. Fig. 6 is a similar view of the lower portion of the same. Fig. 7 is a perspective view of the upper portion of a modified form of sleeve. Fig. 8 is a similar view of the lower portion of the same. Fig. 9 shows a plain anti-friction roller; Fig. 10, a corrugated anti-friction roller, and Fig. 11 a series of balls that may be employed instead of rollers.

A represents the axle of a railroad-car, and B the journal of the same.

C is a sleeve of metal, the internal diameter of which is slightly larger than the diameter of the journal. This sleeve is made in two parts, so that it can be placed around the journal B, and its outer perimeter is provided with rings or circular projections $c$. I prefer to have three of these rings, one at each end of the sleeve and one in the center, as shown in Figs. 1, 3, and 4; but two only might be used, as shown in Figs. 7 and 8. The outer edges of these rings $c$ are formed rounding, so that they are free to travel in correspondingly-formed grooves $d$, in an outer brass D, formed in two parts, as shown, and which is securely held in the box E.

Between the rings $c$, in the sleeve C, are formed slots $a$, in which are placed small steel rollers F or balls F'. These rollers may be plain round steel, with their ends rounding, as shown in Fig. 9, or they may be corrugated, as shown in Fig. 10, or a number of steel balls, as shown in Fig. 11, sufficient to fill the slots $a$, may be employed. The rollers F or balls F' are of such diameter that they just fit the space between the journals B and the outer brass D, the sleeve C holding them in position.

The outer circumference of the sleeve C is of less diameter than the inner diameter of the outer brass D, so that no part of it comes into contact with the brass D, except the rings or projections $c$, which run loosely in the grooves $d$.

The box E, I divide into two parts and hinge them together on one side, as shown at G, Fig. 2, and on the opposite side I provide two lugs or ears H, which are held together by a bolt I. The object of thus forming the box E in two parts is that the outer brass D, sleeve C, and rollers F may be placed in position around the journal B between the head 1 and shoulder 2, and when the two portions of the box E are brought together they are secured by the bolt I, and the sleeve-rollers and brass are held in their proper place. The brass D is preferably of an octagonal form on its outside, as shown, and the interior of the box E is formed to correspond, or it may be of any other suitable shape. A space J is left under and in front of the lower portion of the brass D, so that, if desired, packing and oil or other lubricant may be placed in the box E.

It will be seen that by this construction of journal-bearing all friction in the bearing is between the journal B, rollers F, and brass D, and as the sleeve C is free to rotate and with it the rollers F, which are also free to rotate independently, the friction is reduced to a minimum.

If desired, more than three rollers may be employed around the circumference, the sleeve C being provided with as many slots as it is desired to employ rollers. In Figs. 6 and 7, I have shown a sleeve adapted to receive six rollers.

What I claim as my invention is—

1. In an anti-friction bearing, a divided sleeve provided with slots and rings or round projections on its outer circumference, in combination with friction-rollers, and a divided outer brass having recesses to receive the rings on the sleeve, substantially as and for the purposes set forth.

2. In an anti-friction bearing, the sleeve C, formed in two parts and provided with slots $a$, and rings or circular projections $c$, in combination with the brass D, formed in two parts and provided with recesses $d$, the friction-rollers F, and box E, substantially as shown and described.

3. An anti-friction bearing for car-axles, consisting of the divided sleeve C, rollers F, and brass D, in combination with an axle-box divided into two parts horizontally, whereby the anti-friction bearing can be placed around the axle, substantially as shown and described.

In testimony whereof I have signed my name to this specification, in the presence of two subscribing witnesses, on this 22d day of November, A. D. 1888.

HOSEA W. LIBBEY.

Witnesses:
CHAS. STEERE,
EDWIN PLANTA.